(Model.)
W. DOWNHAM.
Wagon Wheel.
No. 242,285. Patented May 31, 1881.
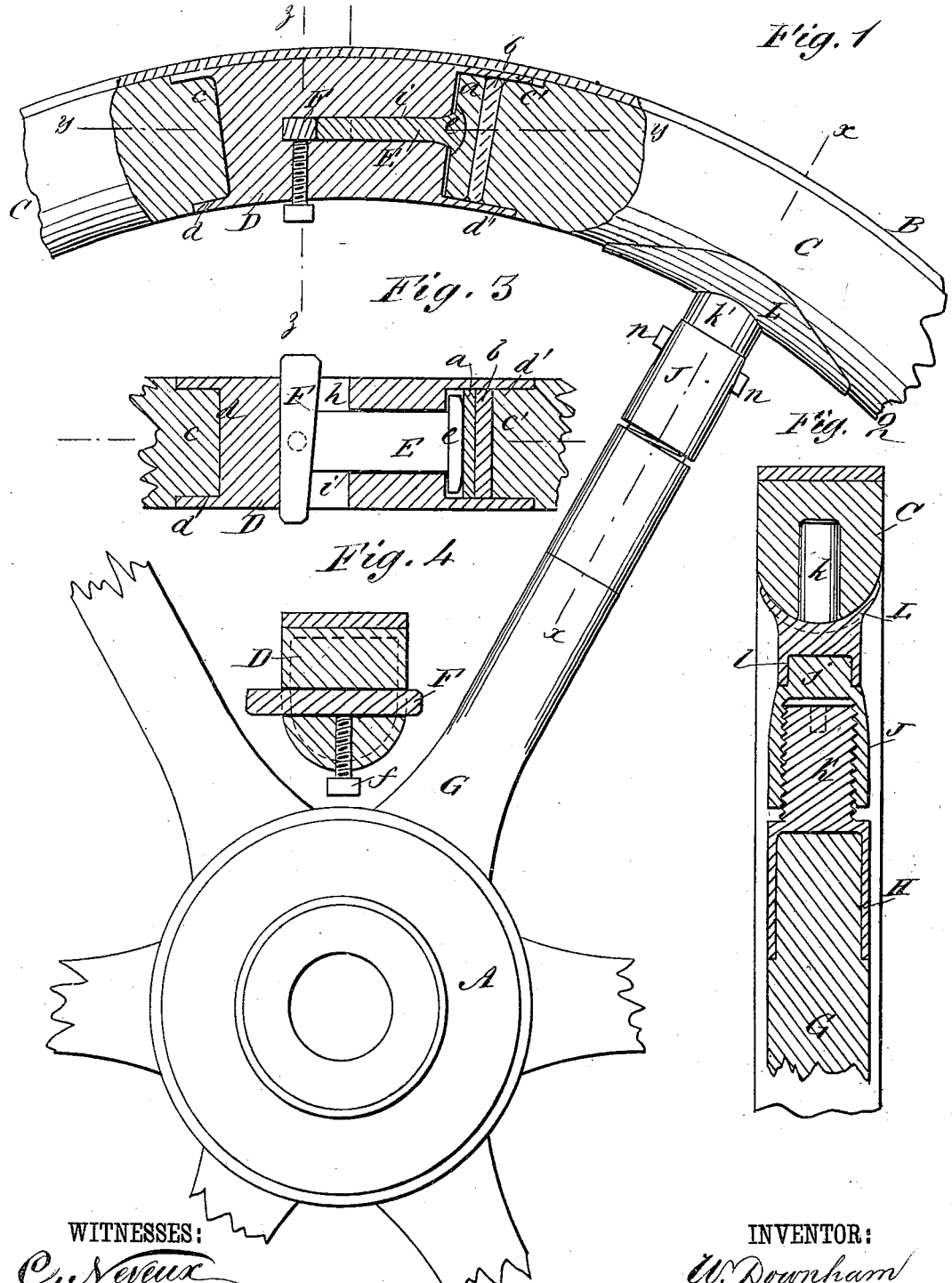

UNITED STATES PATENT OFFICE.

WILLIAM DOWNHAM, OF ST. JOHNS, MICHIGAN.

WAGON-WHEEL.

SPECIFICATION forming part of Letters Patent No. 242,285, dated May 31, 1881.

Application filed March 25, 1881. (Model.)

*To all whom it may concern:*

Be it known that I, WILLIAM DOWNHAM, of St. Johns, in the county of Clinton and State of Michigan, have invented a new Improvement in Wagon-Wheels, of which the following is a full, clear, and exact description.

The object of my invention is to provide means by which the felly of a carriage, wagon, or other similar wheel may be enlarged for the purpose of tightening the tire of the wheel; also, means by which the spokes of the wheel may be lengthened to correspond with the felly when enlarged, and for taking up or tightening any wear or shrinkage of the spokes.

The invention consists, essentially, in providing the felly and the spokes of the wheel with extensible metal sections, the former being extended or enlarged by means of a suitable wedge and the latter by a screw mechanism.

In the accompanying drawings, Figure 1 is a front view of a wheel having my invention attached. The felly attachment is shown in vertical section. Fig. 2 is a section taken on the line $x\ x$, Fig. 1. Fig. 3 is a section taken on the line $y$ of Fig. 1. Fig. 4 is a section taken on the line $z\ z$ of Fig. 1.

Similar letters of reference indicate corresponding parts.

A represents the hub, and B the tire, of the wheel, which are of ordinary construction.

The felly C of the wheel is provided at any point between any two of the spokes of the wheel with the section D, which is of cast or similar metal, and formed at both ends with the recesses or chambers $d\ d'$, which fit like ferrules over the ends $c\ c'$ of the felly.

Within the chamber $d'$ is placed the plate $a$, of metal, and the cushion $b$, of leather, rubber, or similar material, the cushion coming between the plate and the end $c'$ of the felly.

One side of the metal plate $a$ is recessed or rounded out, as shown at $a'$, for the reception of the oval head $c$ of the metal follower E, which is placed in the slot or mortise $i$ formed in the section D, and is moved therein to enlarge the felly by the wedge F, which moves in contact with the rear end of the follower in the cross slot or mortise $h$ in the section D, and which is held in place in said slot by means of the set-screw $f$ entering a vertical screw-tap formed in the metal section.

The spokes G are provided with the ferrule H, which has the threaded extension $h$, over and upon which the screw-cap J fits. The end of the screw-cap J is reduced, as shown at $j$, and fits in the socket $l$ formed in the clip or washer L, and it is provided upon the outside with the lugs $n\ n$, (or slots may be used,) by which the cap is turned by means of a suitable wrench for lengthening the spokes.

The clip or washer L is preferably formed with the stud $k$, which, when in place on the felly C, enters a hole formed in the felly, as shown in Fig. 2, and with the enlargement $k'$, in which is formed the seat or socket for the head $j$ of the screw-cap J.

Thus constructed, the felly may be enlarged for tightening the tire by simply loosening the set-screw $f$ and driving the wedge F, and the spokes may be lengthened to correspond by turning the screw-cap J.

Having thus described my invention, what I claim as new, and desire to secure by Letters Patent, is—

1. The combination of the felly-piece D, having slots $h\ i$ and ends chambered out and fitting over sections of the felly, the plate $a$, the follower E, and the screw $f$, with the felly of a wheel, as and for the purpose specified.

2. The combination, with the spokes and felly, of the ferrule H, having threaded extension $h'$, the screw-cap J, and the clip L, having stud $k$ and enlargement with socket $l$, as and for the purpose specified.

WILLIAM DOWNHAM.

Witnesses:
 H. D. McCABE,
 C. H. McCABE.